US011988803B2

(12) United States Patent
Smoliak et al.

(10) Patent No.: US 11,988,803 B2
(45) Date of Patent: *May 21, 2024

(54) DETERMINING PERSONAL OUTDOOR COMFORT WITH INDIVIDUAL AND ENVIRONMENTAL PARAMETERS

(71) Applicant: WEATHERVANE LABS, LLC, Minneapolis, MN (US)

(72) Inventors: Brian Smoliak, Hopkins, MN (US); Jason Smoliak, Minnetrista, MN (US)

(73) Assignee: Weathervane Labs, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,319

(22) Filed: Mar. 21, 2023

(65) Prior Publication Data
US 2023/0221461 A1 Jul. 13, 2023

Related U.S. Application Data

(63) Continuation of application No. 17/138,197, filed on Dec. 30, 2020, now Pat. No. 11,609,357, which is a (Continued)

(51) Int. Cl.
G08B 21/00 (2006.01)
G01W 1/02 (2006.01)
(Continued)

(52) U.S. Cl.
CPC ............. *G01W 1/02* (2013.01); *G01W 1/04* (2013.01); *G01W 1/10* (2013.01); *H04W 4/025* (2013.01);
(Continued)

(58) Field of Classification Search
CPC ........... G01W 1/02; G01W 1/04; G01W 1/10; G01W 2203/00; H04W 4/025; H04W 4/029; H04W 4/38; Y02A 90/10
(Continued)

(56) References Cited

U.S. PATENT DOCUMENTS 6,223,543 B1* 5/2001 Sandelman .......... F24F 11/0008
62/93
6,336,072 B1 1/2002 Takayama et al.
(Continued)

OTHER PUBLICATIONS

Fanger, "Thermal Comfort: Analysis and Applications in Environmental Engineering"; Danish Technical Press (1970) (54 pgs).
(Continued)

*Primary Examiner* — Mark S Rushing
(74) *Attorney, Agent, or Firm* — Brooks, Cameron & Huebsch, PLLC

(57) ABSTRACT

Devices and systems for determining personal outdoor comfort are described herein. One device includes instructions executable to receive inputs corresponding to characteristics of a user associated with a mobile device, determine a location of the mobile device, communicate an indication of the characteristics and the determined location to a computing device, and receive an outdoor comfort determination from the computing device, wherein the outdoor comfort determination is particular to the user based on the characteristics of the user and particular to the location of the mobile device based on a plurality of environmental parameters associated with the location of the mobile device.

19 Claims, 4 Drawing Sheets

Related U.S. Application Data continuation of application No. 16/121,364, filed on Sep. 4, 2018, now Pat. No. 10,884,162, which is a continuation-in-part of application No. 15/403,724, filed on Jan. 11, 2017, now Pat. No. 10,068,439.

(51) Int. Cl.

| | | |
|---|---|---|
| *G01W 1/04* | (2006.01) | |
| *G01W 1/10* | (2006.01) | |
| *H04W 4/02* | (2018.01) | |
| *H04W 4/029* | (2018.01) | |
| *H04W 4/38* | (2018.01) | |

(52) U.S. Cl.
CPC ........ *H04W 4/029* (2018.02); *G01W 2203/00* (2013.01); *H04W 4/38* (2018.02)

(58) Field of Classification Search
USPC ........................................ 340/601
See application file for complete search history.

(56) References Cited

U.S. PATENT DOCUMENTS

| | | | | |
|---|---|---|---|---|
| 7,084,775 | B1* | 8/2006 | Smith | H04L 12/1895 340/905 |
| 7,251,579 | B2 | 7/2007 | Myers et al. | |
| 7,720,606 | B2* | 5/2010 | Burfeind | G06Q 30/02 715/201 |
| 2003/0178501 | A1 | 9/2003 | Doherty | |
| 2005/0003804 | A1 | 1/2005 | Huomo et al. | |
| 2008/0001735 | A1 | 1/2008 | Tran | |
| 2009/0295587 | A1 | 12/2009 | Gorman, Jr. | |
| 2010/0277303 | A1 | 11/2010 | Chiu et al. | |
| 2011/0210178 | A1 | 9/2011 | Murai et al. | |
| 2012/0232715 | A1 | 9/2012 | Vass et al. | |
| 2014/0272845 | A1 | 9/2014 | Hendricks et al. | |
| 2014/0358291 | A1* | 12/2014 | Wells | G05B 15/02 700/276 |
| 2015/0160633 | A1 | 6/2015 | Adamik et al. | |
| 2018/0153017 | A1* | 5/2018 | Ikehara | H05B 47/16 |

OTHER PUBLICATIONS

Hoppe, "The physiological equivalent temperature—A universal index for the biometeorological assessment of the thermal environment"; International Journal of Biometeorology, vol. 43, pp. 71-75 (Accepted: May 26, 1999) (5 pgs).

Jendritzky, et al., "UTCI—Why another thermal index?" International Journal of Biometeorology, vol. 56, pp. 421-428 (2012) (8 pgs).

Nicol, et al., "Adaptive Thermal Comfort: Principles and Practice"; Routledge: Taylor and Francis Group (2012) (45 bgs).

Nicolopoulou, et al., "Thermal Comfort in Outdoor Urban Spaces: Understanding The Human Parameter"; Solar Energy, vol. 70, No. 3, pp. 227-235 (2001) (9 pgs).

Oke, "Boundary Layer Climates": 2nd Edition, Routledge: Taylor and Francis Group (1987) (460 pgs).

Parsons, "Human Thermal Environments: The Effects of Hot, Moderate, and Cold Environments on Human Health, Comfort, and Performance"; 3rd Edition, CRC Press: Taylor and Francis Group (2002) (626 pgs).

Smoliak, et al., "Dense Network Observations of the Twin Cities Canopy-Layer Urban Heat Island"; Journal of Applied Meteorology and Climatology, vol. 54, pp. 1899-1917 (19 pgs).

Steadman, "The Assessment of Sultriness. Part 1: A Temperature-Humidity Index Based on Human Physiology and Clothing Science"; Journal of Applied Meteorology, vol. 18 (1979) (13 pgs).

Steadman, "The Assessment of Sultriness. Part 2: Effects of Wind, Extra Radiation and Barometric Pressure on Apparent Temperature"; Journal of Applied Meteorology, vol. 18 (1979) (12 pgs).

Steadman, "A Universal Scale of Apparent Temperature"; Journal of Applied Meteorology, vol. 23 (1984) (14 pgs).

Stewart, et al., "Local Climate Zones for Urban Temperatures Studies"; Bulletin of the American Meteorology Society, vol. 93 (Dec. 2012) (22 pgs).

ASHRAE Standard, "Thermal Environment Conditions for Human Occupancy"; ANSI/ASHRAE Standard 55-2010 (38 pgs).

ASHRAE, Thermal Comfort Tool, Version 2, ASHRAE, 2010. https://www.ashrae.org/resources-publications/bookstore/thermal-comfort-tool.

* cited by examiner

DETERMINING PERSONAL OUTDOOR COMFORT WITH INDIVIDUAL AND ENVIRONMENTAL PARAMETERS

CROSS REFERENCE TO RELATED APPLICATIONS

This application is a continuation of U.S. application Ser. No. 17/138,197, filed Dec. 30, 2020, which issues as U.S. Pat. No. 11,609,357 on Mar. 21, 2023, which is a continuation of U.S. application Ser. No. 16/121,364, filed Sep. 4, 2018, which issued as U.S. Pat. No. 10,884,162 on Jan. 5, 2021, which is a continuation in part of U.S. application Ser. No. 15/403,724, filed Jan. 11, 2017, which issued as U.S. Pat. No. 10,068,439, the specification of which is incorporated herein by reference.

TECHNICAL FIELD

The present disclosure relates to devices and systems for determining personal outdoor comfort.

BACKGROUND

Generally, the human body can generate heat from metabolic processes and/or physical activity. When heat generation exceeds heat loss, one may feel hot. Alternatively, when heat loss exceeds heat generation, one may feel cold. Thermal comfort may be perceived when heat generation and heat loss are substantially similar. Outdoor comfort can depend on a variety of factors that mediate heat loss. For example, heat loss can be mediated by air temperature, humidity, and/or wind speed.

Previous approaches to determining outdoor comfort may provide two-parameter indices, multi-parameter indices, indices based on empirical formulas, and/or indices based on physical models derived from first principles. In some cases, such approaches may rely only on atmospheric data. In some cases, such approaches may be applicable only in select temperature ranges. Further, previous approaches may not be personalized to particular individuals and may not adapt to the sorts of variations in physiology and/or psychology that individuals may experience in response to their changing environment.

DETAILED DESCRIPTION

Figure 1:
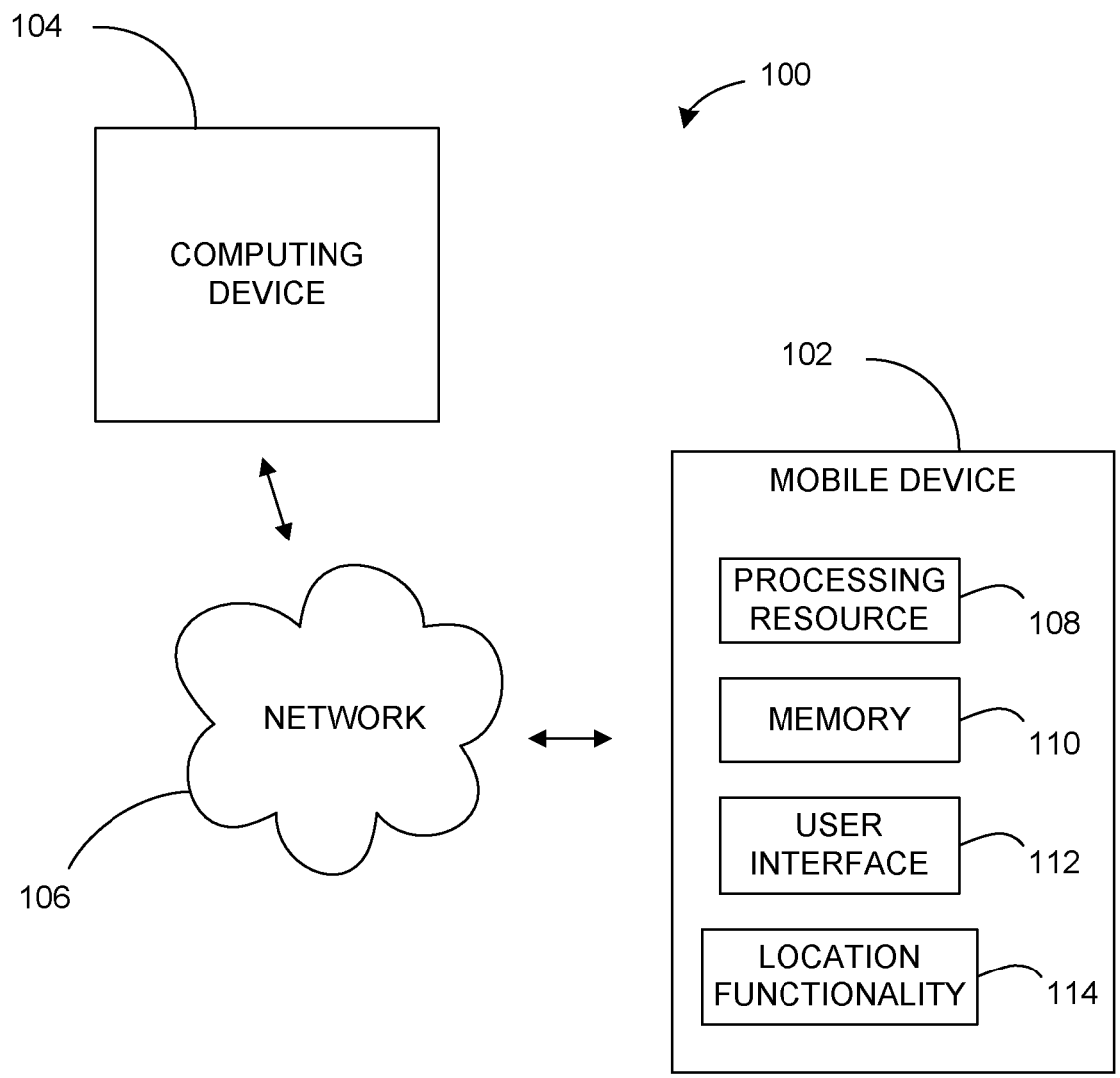
FIG. 1 illustrates an example of a system for determining personal outdoor comfort in accordance with one or more embodiments of the present disclosure.

Determining personal outdoor comfort is described herein. For example, one or more embodiments include a mobile device, comprising a processing resource and a memory having instructions stored thereon which, when executed by the processing resource, cause the processing resource to receive inputs corresponding to characteristics of a user associated with a mobile device, determine a location of the mobile device, communicate an indication of the characteristics and the determined location to a computing device, and receive an outdoor comfort determination from the computing device, wherein the outdoor comfort determination is particular to the user based on the characteristics of the user and particular to the location of the mobile device based on a plurality of environmental parameters associated with the location of the mobile device.

Determining personal outdoor comfort can refer to determining (e.g., predicting) an individual's response to, or comfort level in, outdoor environmental conditions. Stated differently, determining personal outdoor comfort can refer to predicting a personal experience—particular to an individual—of the outdoor conditions. Determining personal outdoor comfort can include providing a comfort level corresponding to outdoor conditions. In some embodiments, such a level may include a numerical value. In some embodiments, such a level may not be numerical in nature. Once determined, the comfort level can be used to select clothing to be worn, activities to be performed, and/or time to be spent outside, for instance.

Embodiments of the present disclosure can determine outdoor comfort for a particular person by tailoring the determination to that person according to their unique physiology, clothing, activity level, and/or their personal perceptions of different environmental conditions, among others.

In contrast with previous approaches, embodiments herein can leverage data beyond traditional atmospheric data. For instance, embodiments herein can utilize land surface information (e.g., land cover classification, impervious surface fraction, forest canopy fraction, surface skin temperature, etc.) to determine outdoor comfort.

Further, because embodiments herein can be personalized to particular users, more meaningful information can be provided than in previous approaches. In an example, a person may be particularly sensitive to wind in that their comfort may depend on wind speed (or lack thereof) more than an average person. Accordingly, an approach that is not personalized may provide them with an output of what the temperature outside "feels like," when, for them, it feels quite different. Embodiments of the present disclosure can alleviate the inconvenience associated with considering and weighing different weather conditions in order to determine comfort level.

Additionally, embodiments herein can adaptively respond to the sorts of variations in physiology and/or psychology that individuals may experience in response to their changing environment. For instance, embodiments herein can leverage past and/or predicted weather patterns. In an example, consider two days that have identical weather conditions: 50 degrees Fahrenheit and mostly cloudy. However, one of the days (day A) is preceded by a week where the temperature never rose above 32 degrees Fahrenheit and the wind routinely gusted, and the other (day B) is preceded by a week where the temperature never fell below 65 degrees Fahrenheit and the sun was unobstructed from sunrise from sunset. A person is likely to feel more comfortable on day A than on day B, despite the identical conditions on those days. Whereas previous approaches may indicate the same comfort level on day A as day B, embodiments herein can recognize the psychological effect of such a shift in weather and respond accordingly. Moreover, because this psychological shift may be felt differently by different users, the personalized nature of embodiments herein can even better determine comfort.

In some embodiments, a user can be provided (e.g., via a mobile device) with a determined comfort level indicated by a value along a scale. Such a scale can include quantitative and/or non-quantitative values ranging from a lower limit—corresponding to dangerously uncomfortable conditions—to an upper limit corresponding to perceived comfort. In some embodiments, contextual and/or explanatory information can be provided in conjunction with the comfort level. Whereas previous approaches may use difficult-to-interpret terms such as "apparent temperature," embodiments of the present disclosure can use terms that are readily interpretable (e.g., hot, cold, comfortable, etc.).

According to one or more embodiments herein, once provided with a determined comfort level, a user can provide evaluation(s) and/or feedback regarding the accuracy of the determination as it pertains to them personally. Accordingly, embodiments of the present disclosure can become increasingly personalized to the user by receiving these evaluations and building an "outdoor comfort profile" (sometimes referred to herein as "comfort profile" or "profile") particular to the user. Such a profile is discussed further herein and can include, for instance, one or more conditions in which the user experiences comfort and/or one or more conditions in which the user experiences discomfort.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of facilities" can refer to one or more facilities.

FIG. 1 illustrates an example of a system 100 for determining personal outdoor comfort in accordance with one or more embodiments of the present disclosure. As shown in FIG. 1, the system 100 can include a mobile device 102 in communication with a computing device 104 via a network 106.

The network 106 can be a network relationship through which the mobile device 102 and the computing device 104 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network 106 can include a number of servers that receive information (e.g., data, inputs, indications, etc.) from the mobile device 102 via a wired or wireless network, and send the information to the computing device 104 via a wired or wireless network (or vice versa).

As used herein, a "network" (e.g., network 106) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

The mobile device 102 can be a smart phone, tablet, personal digital assistant (PDA) or other mobile computing device. In some embodiments, the mobile device 102 can be a wearable device, such as a watch, bracelet, necklace, glasses, etc. Embodiments herein do not limit the mobile device 102 to a particular type of device.

The mobile device 102 can include a memory 110 and a processing resource (e.g., one or more processors) 108. Memory 110 can be any type of storage medium that can be accessed by processing resource 108 to perform various examples of the present disclosure. For example, memory 110 can be a non-transitory computer readable medium having computer readable instructions (e.g., computer program instructions) stored thereon that are executable by processing resource 108 to determine personal outdoor comfort in accordance with the present disclosure. That is, processing resource 108 can execute the executable instructions stored in memory 110 to determine personal outdoor comfort in accordance with the present disclosure. The processing resource 108 may be a central processing unit (CPU), microprocessor, and/or other hardware device suitable for retrieval and execution of instructions stored in the memory 110.

Memory 110 can be volatile or nonvolatile memory. Memory 110 can also be removable (e.g., portable) memory, or non-removable (e.g., internal) memory. For example, memory 110 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 110 is illustrated as being located in the mobile device 102, embodiments of the present disclosure are not so limited. For example, memory 110 can also be located internal to another computing resource (e.g., enabling computer readable instructions to be downloaded over the Internet or another wired or wireless connection).

As shown in FIG. 1, the mobile device 102 can include a user interface 112. A user (e.g., operator) of the mobile device 102 can interact with the mobile device 102 via user interface 112. For example, user interface 112 can provide (e.g., display and/or present) information to the user of the mobile device, such as, for instance, a determined outdoor comfort level, as described herein. Further, user interface 112 can receive information from (e.g., input by) the user of the mobile device 102.

In some embodiments, user interface 112 can be a graphical user interface (GUI) that can include a display (e.g., a screen) that can provide and/or receive information to and/or from the user of the mobile device 102. The display can be, for instance, a touch-screen (e.g., the GUI can include touch-screen capabilities). Embodiments of the present disclosure, however, are not limited to a particular type(s) of user interface.

The mobile device 102 can include a location functionality 114. The location functionality 114 can include circuitry and/or components allowing the mobile device 102 to determine its location (e.g., global geographic location). In some embodiments, the location functionality 114 can include a global positioning system (GPS) receiver. In some embodiments, the location functionality 114 can include a wireless communication component configured to establish a communication with one or more wireless beacons (e.g., Wi-Fi, Bluetooth Low Energy (BLE), etc.). The circuitry and/or components included in the location functionality 114 are not intended to be limited by embodiments herein and are known to those of skill in the art.

The computing device 104 can include a memory and a processing resource analogous to that previously described with respect to the mobile device 102. In some embodiments, the computing device 104 may be referred to as a "back end" or "server" device and the mobile device 102 may be referred to as a "front end" or "client" device, though embodiments of the present disclosure are not so limited.

It is noted that while a single mobile device 102, a single computing device 104, and a single network 106 are illustrated in FIG. 1, embodiments of the present disclosure are not so limited. For instance, as the present disclosure relates to the personalization of comfort determinations for different users, each one of a plurality of users may be associated with a respective mobile device in communication with the computing device 104. Furthermore, though not illustrated in FIG. 1, the system 100 can include one or more "non-mobile" computing devices (e.g., desktop computing devices) in communication with the computing device 104 via the network 106.

Figure 2:
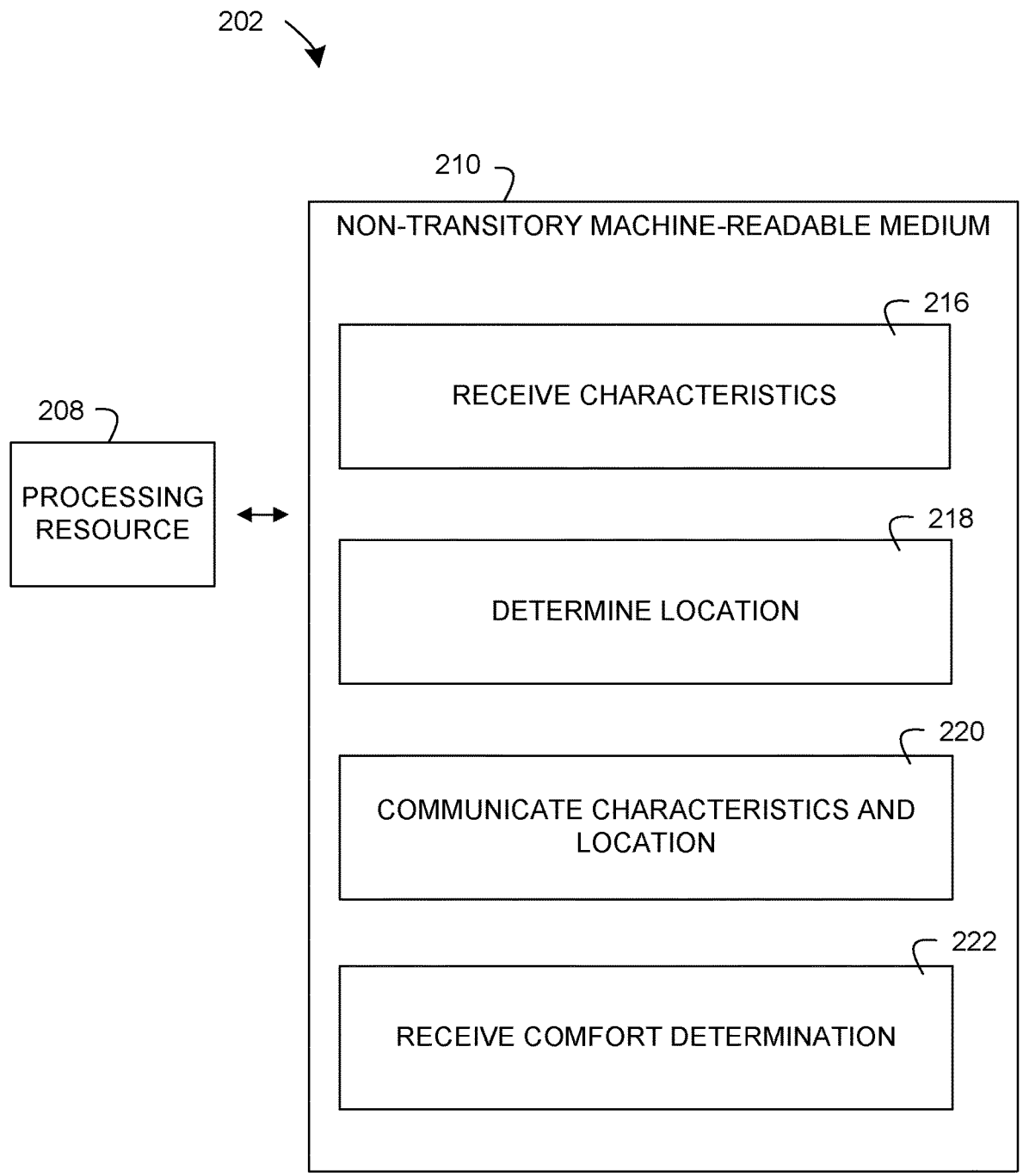
FIG. 2 illustrates a diagram of a mobile device for determining personal outdoor comfort in accordance with one or more embodiments of the present disclosure.

FIG. 2 illustrates a diagram of a mobile device 202 for determining personal outdoor comfort in accordance with one or more embodiments of the present disclosure. The mobile device 202 can include a memory (e.g., a non-transitory machine readable medium) 210 and a processing resource 208, which can be analogous to the memory 110 and processing resource 108, previously described in connection with FIG. 1.

The medium 210 can store instructions 216 executable by the processing resource 208 to receive inputs corresponding to characteristics of a user associated with a mobile device. In some embodiments, a user may authenticate himself to the mobile device. In some embodiments, multiple users may share a mobile device. The characteristics can be input via a prompt, for instance. In some embodiments, the characteristics can include a birth year of the user, a height of the user, a weight of the user, and/or a home location of the user (e.g., address, zip code, etc.). In some embodiments, more detail may be input such as a body fat percentage of the user, metabolic characteristic(s) associated with the user, clothing characteristics associated with the user, sensitivities of the user, and/or activities being performed by the user, for instance.

In some embodiments, metabolic characteristics associated with the user can include resting heart rate, target heart rate, maximum heart rate, and/or basal metabolic rate, among others. In some embodiments, metabolic characteristics can include diet-related characteristics, such as food and/or water intake, for instance.

In some embodiments, clothing characteristics associated with the user can include clothing coverage, clothing quantity (e.g., number of layers), and/or clothing quality (e.g., properties associated with the material and/or construction). In some embodiments, clothing quality can refer to insulative properties of clothing. In some embodiments, clothing quality can refer to permeability of clothing (e.g., to air and/or water).

In some embodiments, default settings for clothing characteristics can be determined that may include seasonally varying clothing that maximizes thermal comfort. In some embodiments a user can input clothing information in order to generate personalized predictions associated with what they are actually wearing (or have available to wear).

In some embodiments, activities being performed by the user can be input. In some embodiments, a duration that corresponds to exposure to outdoor environmental conditions can be input. In some embodiments, "activity" may default to resting in place, and can be altered by selecting an item from a list and, in combination with environmental conditions, associated with changes in the passive and active components of the human thermoregulatory system (e.g. heat generation, blood flow, sweating, shivering, etc.). In some embodiments, common activities during particular environmental conditions can be stored. These activities (or similar activities) may later be suggested when similar environmental conditions recur (discussed further below). Activities may refer to leisure activities, sports, exercise, etc. In some embodiments, activities may be defined more specifically, such as "walking," "running," "skiing," "paddling," "playing tennis," and/or "hiking," for example In some embodiments, sensitivities of the user can refer to a sensitivity of the user to one or more environmental parameters. For example, one user may be particular sensitive to sunlight while another use may be particularly sensitive to cold winds. In some embodiments, sensitivities may be associated with a medical condition experienced by the user. In some embodiments, sensitivities may be associated with a pharmaceutical drug (e.g., medication) taken by the user. In some embodiments, a user may input medical condition(s) and or pharmaceutical drugs and embodiments of the present disclosure can adjust comfort determinations accordingly. Thus, in some cases, the user's sensitivities may be mitigated by embodiments herein even when the user does not have a personal understanding of what those sensitivities are.

The characteristics may be referred to as "user defaults" in that they can represent information characterizing the user that is unlikely to change often. In some embodiments, the user may be prompted periodically (e.g., monthly) to verify that the characteristics remain valid.

The medium 210 can store instructions 218 executable by the processing resource 208 to determine a location of the mobile device. As previously discussed, the mobile device can include a location functionality configured to allow the mobile device to determine its geographic location. For example, the location can be determined using a GPS functionality (e.g., receiver) of the mobile device. In some embodiments, the location may be input by the user. Such embodiments may be implemented if the GPS functionality is disabled and/or malfunctioning, though embodiments herein are not so limited. Locations may be input as coordinates, landmarks, addresses, etc. In some embodiments, the location can be determined to within a high degree of accuracy (e.g., one meter). In some embodiments, the location can be determined with a lesser degree of accuracy (e.g., one city block).

The medium 210 can store instructions 220 executable by the processing resource 208 to communicate (e.g., as a signal) an indication of the characteristics and the determined location to a computing device (e.g., the computing device 104, previously described in connection with FIG. 1). Such communication may be performed responsive to a user input (e.g., opening an application) and/or periodically, for instance. In some embodiments, the determined location can be communicated to the computing device according to a schedule (e.g., once per hour) or responsive to a change in location exceeding a distance threshold. In some embodiments, the characteristics may only be communicated once and then not communicated again until one or more of the characteristics are changed by the user.

The medium 210 can store instructions 222 executable by the processing resource 208 to receive an outdoor comfort determination from the computing device, wherein the outdoor comfort determination is particular to the user based on the characteristics of the user and particular to the location of the mobile device based on a plurality of environmental parameters (e.g., outdoor conditions) associated with the location of the mobile device. The outdoor comfort determination can be made by the computing device, for instance, by a process discussed further below.

The outdoor comfort determination can be displayed to the user via the mobile device. In some embodiments, the outdoor comfort determination can be played as an aural file (e.g., audio) via the mobile device. Manners of communicating and/or providing the outdoor comfort determination to the user are not intended to be limited by the present disclosure.

Figure 3:
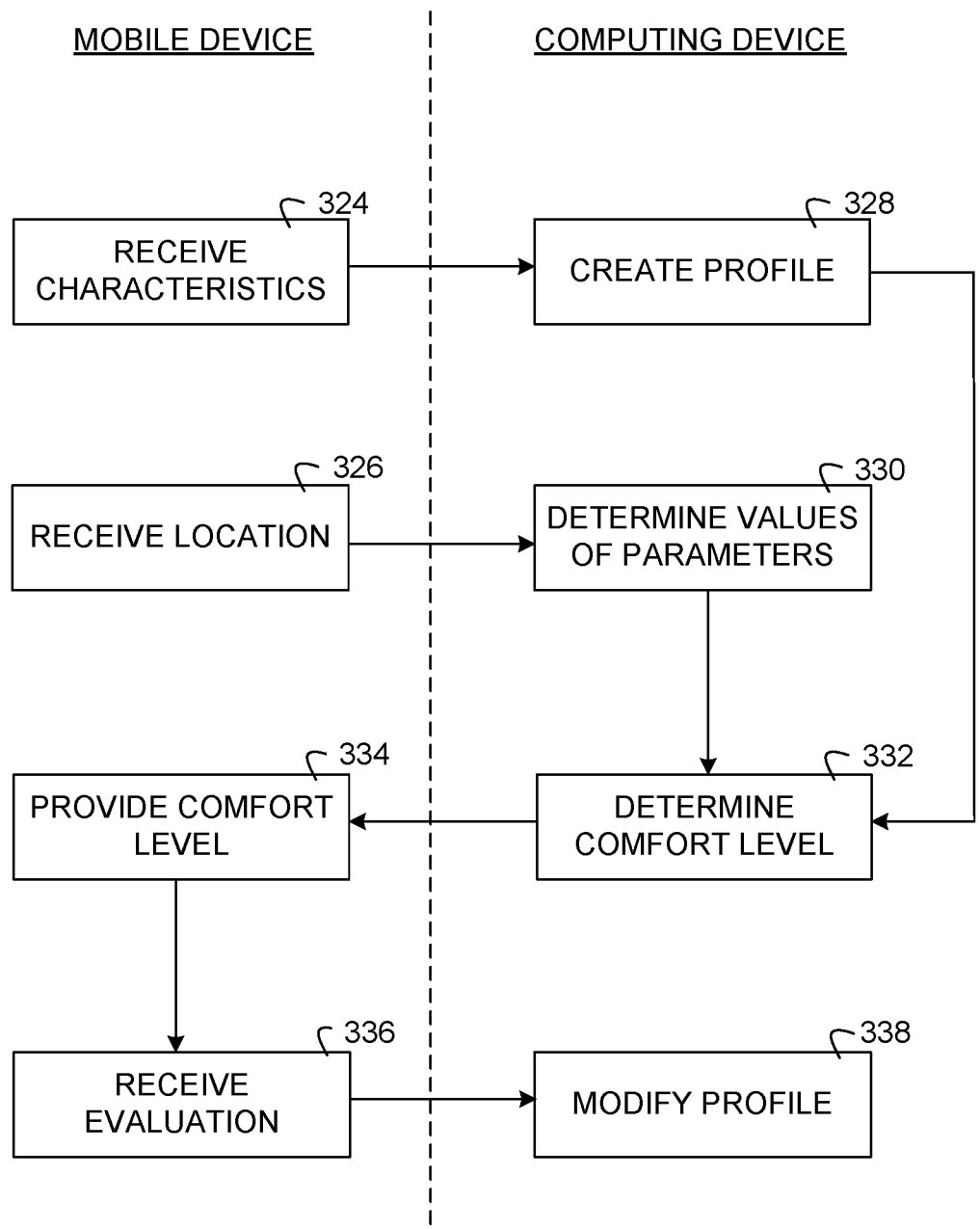
FIG. 3 is a diagram of a flow chart associated with determining personal outdoor comfort in accordance with one or more embodiments of the present disclosure.

FIG. 3 is a diagram of a flow chart associated with determining personal outdoor comfort in accordance with one or more embodiments of the present disclosure. The flow chart illustrated in FIG. 3 can represent instructions executable by a first computing device (e.g., the mobile device 102, previously described in connection with FIG. 1) and a second computing device (e.g., the computing device 104, previously described in connection with FIG. 1). At 324 and 326, characteristics and location can be received via the mobile device in a manner analogous to that previously discussed in connection with FIG. 2.

From the characteristics, the computing device can create a comfort profile for the user at 328. The comfort profile can be unique to the user. The comfort profile includes information particular to the user that bears upon the user's comfort outdoors. For instance, the comfort profile can initially include the characteristics of the user and can be modified with further information personalized to the user (such as that received through user evaluations, discussed below). In some embodiments, the comfort profile can include historical location(s) of the mobile device, clothing characteristics associated with the user of the mobile device (e.g., clothing worn and/or possessed by the user), activities in which the user engages, season(s) in which the user is active or inactive, etc.

From the location of the mobile device, the computing device can, at 330, determine a respective value for each of a plurality of environmental parameters local to the mobile device. In some embodiments, environmental parameters can be received from an external entity (e.g., a weather service). In some embodiments, environmental parameters can include air temperature, dew point, wind speed, wind direction, and/or terrestrial and/or solar radiation. Embodiments of the present disclosure do not limit the types of environmental parameters for which values are determined. It is to be understood that environmental parameters as discussed herein refer to parameters that are related to (e.g., bear on) outdoor comfort. For example, environmental parameters can include one or more aspects of weather and/or climate.

In some embodiments, environmental parameters include current parameters. In some embodiments, environmental parameters include historical parameters. Historical parameters can refer to recent parameters (e.g., a previous day) and/or older parameters (e.g., previous weeks, years, etc.). In some embodiments, environmental parameters include future (e.g., predicted) parameters. The environmental parameters may be determined for a city or zip code in which the mobile device is located. The environmental parameters may be determined for a more localized area (e.g., street, one-acre parcel, etc.).

The values determined for the parameters may be applicable for a particular time period such as, for instance, the next two or three hours, the next 24 hours, or the next day. Further, the computing device may receive and/or determine the values for the parameters periodically. For instance, the computing device may receive a weather forecast once an hour, once a day, etc. The accuracy and/or reliability of the weather forecast may depend on the time horizon for the forecast and/or the frequency with which the forecast is received (e.g., the shorter the time horizon and/or higher the frequency, the greater the accuracy and/or reliability of the forecast). However, embodiments of the present disclosure are not limited to particular information that can be included in a forecast, a particular time horizon for a forecast, or a particular frequency with which a forecast can be received.

In some embodiments, determining environmental parameters can include determining parameters based on land surface information. For instance, because surface meteorological observations may be relatively sparse, land surface information can be used to improve the granularity and/or accuracy of such observations. Land surface type and/or character can affect a number of surface weather and/or climate parameters. For example, the urban heat island effect and/or the shading effects of forests can affect environmental parameters. Embodiments of the present disclosure can utilize land surface information to adjust meteorological values.

In accordance with embodiments herein, land surface information includes impervious surface fraction, tree canopy fraction, normalized difference vegetation index (NDVI), land cover classification, building height to width ratio, building height to length ratio, snow cover fraction, snow depth, surface skin temperature, and/or volumetric soil moisture. For instance, soil moisture, snow cover, and/or surface skin temperature can affect the mean radiant temperature, an environmental factor bearing on human comfort. Building height and width can define the "urban canyon" and can affect mean radiant temperature, wind speed, and incoming radiation through effects such as shadowing, reflection, channeling, and absorption.

Because, for instance, land cover classification is relatively static in character, it can be measured to a resolution of less than 100 feet in some cases. Combined with information regarding land surface conditions, such high-resolution information can be used to fill the gaps between meteorological point observations (e.g., weather stations) and/or modeled grid cells.

In some embodiments, a data assimilation method can be performed using a numerical model with detailed land use boundary forcing data. For example, in some embodiments, a land surface model can be forced with past, observed, and forecast meteorological data (e.g., in "offline mode") to produce downscaled conditions taking into account relatively high-resolution land surface conditions. In some embodiments, a fully coupled numerical weather prediction model can be used that includes a land surface model.

In some embodiments, statistical modeling can be performed that relates land surface values to one or more meteorological values. Estimates of meteorological values influenced by a type and/or condition of land surface can be determined using a geostatistical method, for instance.

Thus, whereas previous approaches may be limited to measurements where meteorological instruments are available, embodiments of the present disclosure can determine the local effects land surface can have on environmental parameters measured with these instruments. To illustrate, in previous approaches, a user's weather forecast may be applicable at the location of the nearest instrument station (e.g., an airport). However, a user in a large city 15 miles from the airport may experience quite different environmental conditions including, for example, increased air temperature due to urban heating, differing wind speeds between buildings, and/or varying solar conditions in areas of sun, shadow, reflection, and/or absorption.

Once values for parameters in the location are determined and/or received, a comfort level particular to the user can be determined based on the values of the parameters and the user's comfort profile at 332. In some embodiments, a default comfort level (e.g., a comfort level not particular to any individual user) may be determined and adjustments may be made based on the individual user's profile. For instance if the user's age exceeds an age threshold and/or if the user's weight does not exceed a weight threshold, embodiments herein may determine that the user may find comfort in warmer temperatures than a person considered to be typical.

In accordance with embodiments herein, a default (e.g., non-specific to a user) value along a normalized model index can be determined. In some embodiments, the normalized model index can range from −1 to 1, corresponding to a spectrum spanning dangerously cold conditions (−1), perceived equilibrium and/or comfort (0), and dangerously hot conditions (1). The normalized model index can be transformed to an outdoor comfort index by a product of one minus the absolute value of the normalized model index and a constant. The constant can be selected to define an upper limit of the outdoor comfort index. For example, a constant of 10 can yield an outdoor comfort index that ranges from 0 to 10, and a constant of 100 can yield an outdoor comfort index that ranges from 0 to 100.

Accordingly, based on the user's profile and the values of the environmental parameters, the comfort level provided to the user can be a particular value selected from a comfort index having a plurality of values corresponding to different levels of human comfort, where the lower limit (e.g., 0) can represent dangerously uncomfortable conditions (e.g., extreme heat or cold) and the upper limit (e.g., 10) can represent perceived comfort. To illustrate, if it is determined that a particular set of weather conditions are slightly too cool for a certain user's comfort, that user may be provided with a comfort level of "9." If it is determined that a particular set of weather conditions are slightly too warm for a user's comfort, that user may be provided with a comfort level of "9."

The comfort level can be communicated to the mobile device and provided to the user (e.g., via a display) at 334.

In addition to the determined comfort level, embodiments herein can provide additional information that provides context and/or explains the selection of the particular level from the index. In some embodiments, contextual information can include qualitative information describing the comfort level (e.g., adjectives describing the weather) such as, for example, "comfortable," "uncomfortable," "chilly," "muggy," "brisk," etc. In some embodiments, explanatory information can include more detailed information describing the rationale for the selected level and/or the contextual information such as, for example, "high winds," "low humidity," "obscured sunlight," etc.

Accordingly, embodiments herein can provide meaningful comfort information to a user in a plurality of manners. One manner can include a number selected from a comfort index that provides a user with a high-level determination of how comfortable he or she is likely to be. Another manner can include contextual information giving context to the number (e.g., whether warm or cool). Another manner can include explanatory information describing in further detail why the number and/or the contextual information was selected, and another manner can include qualitative information describing the determined outdoor comfort level. In some embodiments, the user can activate and/or deactivate the provision of one or more of these manners.

In some embodiments, the information provided to the user may depend on the user's particular location. In an example where the user works in a large city, the user can be provided with two comfort levels: one for when the user is exposed to sunlight, and another for when the sun is obscured from the user by one or more buildings, for instance. In some cases, the user may intend on traveling from one location to another in a particular period of time and may desire to know his comfort level in a remote location. Accordingly, embodiments herein can allow the user to input a location using the mobile device and be provided with a determined comfort level in that remote location.

In some embodiments, a suggestion may be communicated associated with increasing the determined outdoor comfort level. For example, such a suggestion can include a suggestion to change clothing, change activities, and/or change location. Particular suggestions can be made. For example, a suggestion to wear a hat and/or increase heart rate through activity can be provided. In some embodiments, the information provided to the user can include a range of thermal comfort values associated with different clothing choices and/or activities. In some embodiments, one or more activities may be suggested when environmental conditions are similar to those where the activit(ies) were previously performed by the user.

Upon receiving the comfort level and the additional information, the user can provide (e.g., via the mobile device) an evaluation of the determined comfort level and/or the additional information at 336. In some embodiments, the user can be provided with a plurality of selectable options to indicate his actual perceived comfort level. For example, the plurality of options can include "very hot," "hot," "warm," "comfortable," "cool," "cold," and "very cold." In some embodiments, the user can be provided with a scale (e.g., a slider and/or quantitative scale) ranging from an uncomfortably cold level to an uncomfortably hot level. The selection made by the user along such a scale can be converted to a value between −1 and 1 for determination of the user's actual perceived comfort level.

In some embodiments, the user can evaluate the contextual and/or explanatory information. For example, the user can select terms he wishes to be used and/or remove those he dislikes. In some embodiments the user can control an amount of information provided. It is to be understood that particular users may be interested in more detailed information and/or context than other users and embodiments of the present disclosure can be customized accordingly.

In some embodiments, the user evaluation can include an approval of a particular value of one or more of the parameters related to outdoor comfort for the activity being performed (or intended to be performed). For example, the user can indicate that one or more conditions are particularly suitable for a given activity. Embodiments of the present disclosure can subsequently recommend that activity responsive to a subsequent occurrence of those one or more conditions (e.g., either in the same location or in a different location). In an example, the user can indicate that they enjoyed a run on a cool, foggy morning with low light conditions. When those conditions occur again a week later, a run may be recommended.

In some embodiments, the subsequent conditions exceed a similarity threshold with the conditions approved by the user in order for the activity to be recommended. Stated differently, if a first determined comfort level for a given activity and a user evaluation of that determined comfort level for that activity exceed a first similarity threshold (e.g., the user approves of the determined comfort level for that activity in those conditions) and a subsequent comfort level is determined to exceed a second similarity threshold with the first determined comfort level (e.g., the conditions are sufficiently similar at a later time), the activity may be recommended. Such thresholds may be automatically determined and can be modified by the user. For instance, one user may be picky with regard to the conditions in which they will go paddle boarding and may thus insist on exact conditions for paddle boarding to be recommended, whereas another user may be less exacting with the conditions leading to golf being recommended.

At 338, the computing device can receive an indication of the user's evaluation and modify the user's comfort profile based on that evaluation. For example, the computing device can determine that the user is particularly sensitive to wind, sunlight, heat, and/or other aspects of comfort based on differences between the provided comfort levels and the evaluations. Embodiments of the present disclosure can train and/or learn user preferences for different outdoor conditions and/or locations based on user evaluations over time. Accordingly, over a number of iterations of evaluations of different comfort levels in different conditions, embodiments of the present disclosure can become increasingly personalized to a user. Stated in other terms, a user's profile can be modified based on a first evaluation, the modified profile can be modified again based on a second evaluation, and so on.

According to some embodiments, a notification can be provided to the mobile device responsive to a difference between the determined outdoor comfort level and the user evaluation of the determined outdoor comfort level exceeding a threshold. For instance, embodiments herein can determine that it is unlikely that the user is indeed comfortable (as indicated) at −20 degrees Fahrenheit. Accordingly, a notification can be provided that presents the user with a warning and/or mitigation measures. Similarly, if a user reports feeling "cool" in dangerously hot conditions, a notification can be provided. Such a notification can be provided to the mobile device and/or to other devices specified by the user (e.g., devices of friends, family, and/or people proximal to the user's location).

In some embodiments, a user can be provided with notifications and/or recommendations (e.g., tips) for achieving comfort. For example, one or more items of clothing (e.g., a coat) can be suggested based on the conditions. In another example, a user can be notified that activity below a certain level is likely to result in relative discomfort and activity above that level is likely to result in relative comfort.

Figure 4:
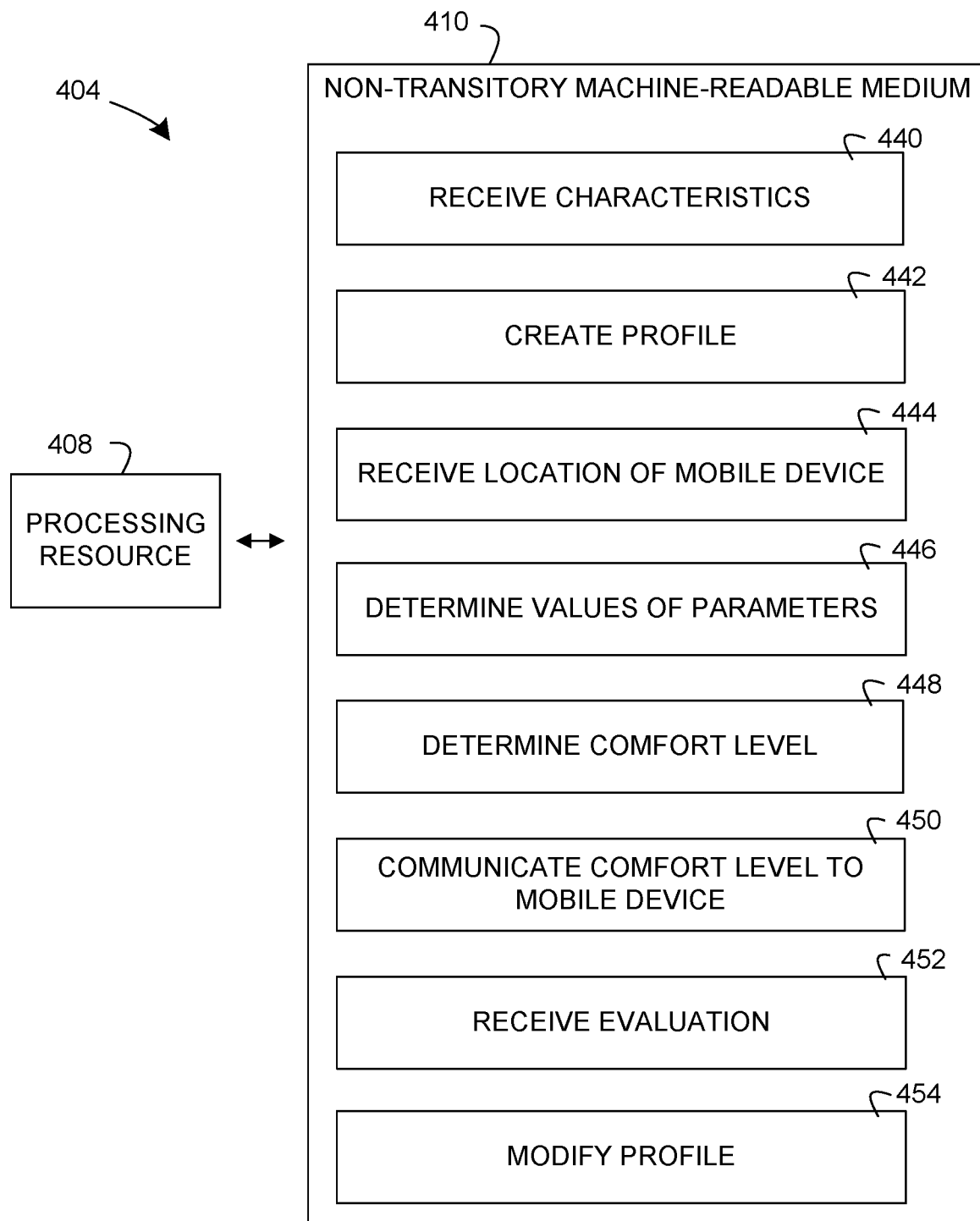
FIG. 4 illustrates a diagram of a computing device for determining personal outdoor comfort in accordance with one or more embodiments of the present disclosure.

FIG. 4 illustrates a diagram of a computing device 404 for determining personal outdoor comfort in accordance with one or more embodiments of the present disclosure. The computing device 404 can include a memory (e.g., a non-transitory machine readable medium) 410 and a processing resource 408, which can be functionally analogous to the memory 110 and processing resource 108, previously described in connection with FIG. 1. The medium 410 can store instructions executable by the processing resource to carry out the functions previously discussed with respect to the computing device in FIG. 3.

For instance, the medium 410 can store instructions 440 executable by the processing resource 408 to receive indications of a plurality of characteristics of a user associated with a mobile device. The medium 410 can store instructions 442 executable by the processing resource 408 to create an outdoor comfort profile associated with the user based on the characteristics. The medium 410 can store instructions 444 executable by the processing resource 408 to receive an indication of a location of the mobile device.

The medium 410 can store instructions 446 executable by the processing resource 408 to determine a respective value for each of a plurality of parameters related to (e.g., bearing on) outdoor comfort at the location of the mobile device. The medium 410 can store instructions 448 executable by the processing resource 408 to determine an outdoor comfort level particular to the user at the location of the mobile device based on the values of the parameters and the outdoor comfort profile. The medium 410 can store instructions 450 executable by the processing resource 408 to communicate the determined outdoor comfort level to the mobile device.

The medium 410 can store instructions 452 executable by the processing resource 408 to receive, from the mobile device, an indication of a user evaluation of the determined outdoor comfort level. The medium 410 can store instructions 454 executable by the processing resource 408 to modify the outdoor comfort profile associated with the user based on the user evaluation.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A mobile device, comprising:
   a processing resource; and
   a memory having instructions stored thereon which, when executed by the processing resource, cause the processing resource to:
      receive inputs, via an interface of the mobile device, corresponding to a plurality of user characteristics, including a physical characteristic of the user;
      determine a location of the mobile device;
      communicate an indication of the characteristics and the determined location to a computing device; and
      receive an indication of a likelihood of comfort in outdoor environmental conditions from the computing device, the likelihood personalized to the user and communicating a determination, made by the computing device, of how likely the user is to be comfortable in outdoor environmental conditions based on the user characteristics and at least one environmental parameter associated with the location of the mobile device.

2. The device of claim 1, wherein the plurality of characteristics includes:
   a birth year of the user;
   a height of the user;
   a weight of the user; and
   a home location of the user.

3. The device of claim 1, wherein the plurality of characteristics includes:
   a clothing characteristic associated with the user; and
   an activity being performed by the user.

4. The device of claim 1, wherein the plurality of characteristics includes:
   a sensitivity of the user to at least one of the plurality of environmental parameters associated with the location of the mobile device.

5. The device of claim 4, wherein the sensitivity is associated with a medical condition currently experienced by the user.

6. The device of claim 4, wherein the sensitivity is associated with a pharmaceutical drug being taken by the user.

7. The device of claim 1, wherein the at least one environmental parameter associated with the location of the mobile device includes:
   an air temperature associated with the location;
   a dew point associated with the location;
   a wind speed associated with the location; or
   an incoming solar radiation associated with the location.

8. The device of claim 1, wherein the at least one environmental parameter associated with the location of the mobile device includes at least one of: current environmental parameters, historical environmental parameters, and predicted future environmental parameters.

9. A computing device for determining personal outdoor comfort, comprising:
   a processing resource; and
   a memory having instructions stored thereon which, when executed by the processing resource, cause the processing resource to:
      receive indications of inputs made via an interface of a mobile device corresponding to a plurality of characteristics personal to a user;
      create an outdoor comfort profile associated with the user based on the plurality of characteristics;
      determine a respective value for each of a plurality of outdoor environmental parameters local to a mobile device associated with the user;
      determine a likelihood that the user would be comfortable in outdoor environmental conditions based on the values of the parameters and the outdoor comfort profile; and
      communicate the determined likelihood and explanatory information related to the plurality of outdoor environmental parameters to the mobile device.

10. The computing device of claim 9, including instructions to receive a user evaluation of outdoor comfort from the mobile device.

11. The computing device of claim 9, including instructions to:
   determine a respective value for each of the plurality of environmental parameters at a location remote from the mobile device based on a location input made using the mobile device;
   determine a different likelihood that the user would be comfortable outdoors particular to the user at the remote location based on the values of the parameters at the remote location and the outdoor comfort profile; and
   communicate the different likelihood to the mobile device.

12. The computing device of claim 9, including instructions to determine the respective value for each of the plurality of environmental parameters local to the mobile device, wherein the plurality of environmental parameters local to the mobile device includes land surface information local to the mobile device.

13. The computing device of claim 9, including instructions to determine and communicate a suggestion associated with increasing the determined likelihood.

14. The computing device of claim 13, wherein the suggestion includes at least one of:
   a suggestion to change clothing worn by the user;
   a suggestion to change an activity performed by the user;
   a suggestion to change scheduling of activity; and
   a suggestion to change a location of the user.

15. A non-transitory machine-readable medium having instructions stored thereon which, when executed by a processing resource, cause the processing resource to:
   receive indications of a plurality of characteristics of a user associated with a mobile device, including a clothing characteristic associated with the user, based on inputs made into an interface;
   create an outdoor comfort profile associated with the user based on the characteristics;
   receive an indication of a location of the mobile device;
   determine a respective value for each of a plurality of parameters related to outdoor comfort at the location of the mobile device;
   determine an outdoor comfort level particular to the user at the location of the mobile device based on the values of the parameters and the outdoor comfort profile;
   communicate the determined outdoor comfort level to the mobile device;

receive, from the mobile device, an indication of a user evaluation; and modify the outdoor comfort profile associated with the user based on the user evaluation.

16. The medium of claim 15, wherein the user evaluation includes an approval of one or more particular parameters related to outdoor comfort at the location of the mobile device for an activity intended to be performed by the user.

17. The medium of claim 16, including instructions to subsequently recommend the activity intended to be performed by the user responsive to a determination of a subsequent occurrence of the particular value or combination of values of the at least one of the parameters related to outdoor comfort at the location of the mobile device.

18. The medium of claim 15, including instructions to:

receive an indication of a subsequent location of the mobile device;

determine a respective value for each of the plurality of parameters related to outdoor comfort at the subsequent location of the mobile device;

determine a subsequent outdoor comfort level particular to the user at the subsequent location of the mobile device based on the values of the parameters at the subsequent location and the modified outdoor comfort profile;

communicate the subsequent determined outdoor comfort level to the mobile device; and recommend an activity intended to be performed by the user at the subsequent location responsive to a determination that:

the determined outdoor comfort level and the user evaluation exceed a first similarity threshold; and the subsequent determined outdoor comfort level and the determined outdoor comfort level exceed a second similarity threshold.

19. The medium of claim 15, wherein the user evaluation includes a preferred change of thermal sensation.

* * * * *